(12) United States Patent
Tracy et al.

(10) Patent No.: US 7,561,451 B2
(45) Date of Patent: Jul. 14, 2009

(54) POWER CONVERTER APPARATUS AND METHODS USING A PHASE REFERENCE DERIVED FROM A DC BUS VOLTAGE

(75) Inventors: John G. Tracy, Raleigh, NC (US); Hans-Erik Pfitzer, Wake Forest, NC (US); Keith Bauman, Oxford, NC (US)

(73) Assignee: Eaton Corporation, Cleveland, OH (US)

( * ) Notice: Subject to any disclaimer, the term of this patent is extended or adjusted under 35 U.S.C. 154(b) by 807 days.

(21) Appl. No.: 10/834,696

(22) Filed: Apr. 29, 2004

(65) Prior Publication Data

US 2005/0243488 A1 Nov. 3, 2005

(51) Int. Cl.
| | |
|---|---|
| H02M 7/04 | (2006.01) |
| H02M 5/42 | (2006.01) |
| H02M 5/40 | (2006.01) |
| H02M 3/36 | (2006.01) |
| H02M 5/45 | (2006.01) |
| H02M 1/12 | (2006.01) |
| H02M 1/14 | (2006.01) |
| G05F 5/00 | (2006.01) |
| G05F 1/00 | (2006.01) |
| H02J 3/12 | (2006.01) |

(52) U.S. Cl. .............. 363/84; 363/34; 363/35; 363/36; 363/40; 363/41; 363/89; 363/98; 323/212; 323/213; 323/237; 323/241; 323/300

(58) Field of Classification Search .......... 307/66, 307/105; 323/207, 212, 213, 237, 241, 300; 363/34–36, 40, 41, 98, 84, 89
See application file for complete search history.

(56) References Cited

U.S. PATENT DOCUMENTS

| | | | | |
|---|---|---|---|---|
| 4,366,390 A | | 12/1982 | Rathmann | |
| 5,317,500 A | * | 5/1994 | Iden et al. | ...................... 363/98 |
| 5,541,488 A | * | 7/1996 | Bansal et al. | ............... 318/801 |

(Continued)

OTHER PUBLICATIONS

Singh et al., Fuzzy Control of Integrated Current Controlled Converter-Inverter FED Cage Induction Motor Drive, 1995, IEEE, IA&C-95, pp. 153-159.*

(Continued)

*Primary Examiner*—Akm E Ullah
*Assistant Examiner*—Jue Zhang
(74) *Attorney, Agent, or Firm*—Myers Bigel Sibley & Sajovec, P.A.

(57) ABSTRACT

In a power converter apparatus, such as an uninterruptible power supply, a phase reference signal is generated responsive to a DC voltage on a DC bus. A magnitude reference signal may be generated responsive to a phase current of an AC bus and/or the DC voltage on the DC bus. Power is transferred between the AC and DC busses responsive to the phase reference signal and the magnitude reference signal. Generation of the phase reference signal may include generating a DC voltage error signal responsive to the DC voltage on the DC bus, generating a phase offset signal responsive to the DC voltage error signal, and generating the phase reference signal responsive to the phase offset signal. Generation of the magnitude reference signal may include generating a volt-amperes reactive (VAR) error signal responsive to the phase current and generating the magnitude reference signal responsive to the VAR error signal.

31 Claims, 7 Drawing Sheets

U.S. PATENT DOCUMENTS

| | | | |
|---|---|---|---|
| 5,745,356 A | | 4/1998 | Tassitino, Jr. et al. |
| 5,867,379 A | * | 2/1999 | Maksimovic et al. ......... 363/89 |
| 5,880,947 A | * | 3/1999 | Imanaka et al. ............... 363/89 |
| 6,005,783 A | * | 12/1999 | Xue et al. ...................... 363/36 |
| 6,507,505 B2 | * | 1/2003 | Oka et al. ...................... 363/47 |
| 6,583,995 B2 | * | 6/2003 | Kalman et al. ................ 363/35 |
| 6,791,204 B2 | * | 9/2004 | Sarlioglu et al. .............. 290/52 |
| 7,088,601 B2 | * | 8/2006 | Tracy et al. .................... 363/98 |
| 7,148,649 B2 | * | 12/2006 | Ganev ......................... 363/127 |
| 7,177,165 B2 | * | 2/2007 | Deng et al. .................... 363/40 |
| 2001/0026460 A1 | * | 10/2001 | Ito et al. ....................... 363/34 |
| 2002/0110007 A1 | * | 8/2002 | Kalman et al. ................ 363/35 |
| 2003/0007369 A1 | * | 1/2003 | Gilbreth et al. ............... 363/35 |

OTHER PUBLICATIONS

Invitation to Pay Additional Fees and Partial International Search Report for International patent application No. PCT/US2005/014017 mailed on Oct. 14, 2005.

Verdelho et al. "DC Voltage Control and Stability Analysis fo PWM-Voltage-Type Reversible Rectifiers" *IEEE Transactions on Industrial Electronics* 45(2): 263-273 (1998).

International Search Report and Written Opinion of the International Searching Authority for International Patent Application No. PCT/US2005/014017 mailed on Jul. 4, 2006.

\* cited by examiner

POWER CONVERTER APPARATUS AND METHODS USING A PHASE REFERENCE DERIVED FROM A DC BUS VOLTAGE

BACKGROUND OF THE INVENTION

The present invention relates to power converter apparatus and methods, and more particularly, to apparatus and methods for power transfer between AC and DC busses.

AC/DC power converters are used in a variety of applications, including in DC power supplies and uninterruptible power supplies (UPSs). For example, a UPS may include an input rectifier that is used to convert AC voltage from an AC source, such as a utility source, to a DC voltage on a DC bus, which can also be powered from an auxiliary source, such as a battery. The DC voltage may be provided directly to loads, as is common in telecommunications applications, and/or may be converted back to an AC output voltage by an inverter and used to power AC loads, as is common in data processing and industrial applications.

Such input rectifiers may take a variety of different forms. For example, some power converters may include a passive input rectifier, such as a diode bridge, that produces a DC output that generally varies with the AC input voltage. Other power converters use active rectifiers, e.g., transistor bridge circuits that can be controlled to provide regulation of the DC output voltage. A variety of different control techniques may be used in such active rectifier circuits. One conventional technique, described in U.S. Pat. No. 4,366,390 to Rathmann, involves use of a bidirectional converter unit that stabilizes a DC bus voltage by shifting the phase of the AC voltage on the AC bus relative to an AC source coupled to the AC bus.

SUMMARY OF THE INVENTION

In some embodiments of the invention, methods for transferring power between a DC bus and an AC bus are provided. A DC voltage error signal is generated responsive to a DC voltage on the DC bus. The DC voltage error signal is differentiated to generate a phase offset signal, and power is transferred between the AC and DC busses responsive to the phase offset signal, for example, using a converter circuit, such as an active bridge circuit. In certain embodiments, a phase reference signal is generated responsive to the phase offset signal, and power is transferred between the AC and DC busses responsive to the phase reference signal.

In some embodiments, a series of samples of the DC voltage on the DC bus are generated, and respective DC voltage en-or signal values are generated for respective ones of the samples of the DC voltage. Weighted differences between successive ones of the DC voltage error signal values are determined to generate a series of phase offset signal values. A series of phase reference signal values is generated from the series of phase offset signal values. A phase reference signal value may be generated from a previously computed phase reference signal value, a phase offset signal value, and a phase angle-per-step value. The phase-angle-per step value may be generated responsive to an AC voltage-on the AC bus.

According to further aspects, a power converter is operated responsive to the phase offset signal to provide power transfer between the AC and DC busses. The phase offset signal represents an amount of phase shift between an input of the power converter and an AC source driving the AC bus needed to maintain a desired voltage on the DC bus. In further embodiments of the invention, a power converter has a first port coupled to an AC bus and second port coupled to a DC bus. A phase reference signal is generated responsive to a DC voltage on the DC bus without determining a phase difference between the first port of the power converter and an AC source driving the AC bus. The power converter is operated responsive to the phase reference signal.

According to still further embodiments of the invention, a phase reference signal is generated responsive to a DC voltage on a DC bus. Power is transferred between the AC and DC busses responsive to the phase reference signal and a magnitude reference signal. The magnitude reference signal may be generated responsive to a phase current of an AC bus and/or the DC voltage on the DC bus. Generation of the phase reference signal may include generating a DC voltage error signal responsive to the DC voltage on the DC bus, generating a phase offset signal responsive to the DC voltage error signal, and generating the phase reference signal responsive to the phase offset signal. Generation of the magnitude reference signal may include generating a volt-amperes reactive (VAR) error signal responsive to the phase current and generating the magnitude reference signal responsive to the VAR error signal. In further embodiments, the magnitude reference signal may be generated from the DC voltage error signal. In still further embodiments, the magnitude reference signal may be generated from both a VAR error signal and a DC voltage error signal.

According to some embodiments of the invention, an apparatus for transferring power between an AC bus and a DC bus is provided. The apparatus includes a converter circuit coupled between the AC and DC busses and operative to generate a DC voltage error signal responsive to a DC voltage on the DC bus, to differentiate the DC voltage error signal to generate the phase offset signal, and to transfer power between the AC and DC busses responsive to the phase offset signal. The converter circuit may be operative to generate a phase reference signal responsive to the phase offset signal and to transfer power between the AC and DC busses responsive to the phase reference signal.

In additional embodiments, an apparatus for transferring power between an AC bus and DC bus includes a power converter circuit, such as an active bridge circuit, that is operative to transfer power between the AC and DC busses responsive to a phase reference signal and a magnitude reference signal. A phase reference signal generator circuit is operative to generate the phase reference signal responsive to a DC voltage on the DC bus. The magnitude reference signal generator circuit may be operative to generate the magnitude reference signal responsive to a phase current of the AC bus and/or the DC voltage on the DC bus.

According to further aspects of the invention, an uninterruptible power supply (UPS) includes an AC bus, a DC bus, and a power converter circuit operative to transfer power between the AC and DC busses responsive to a phase reference signal and a magnitude reference signal. The UPS further includes a phase reference signal generator circuit operative to generate the phase reference signal responsive to a DC voltage on the DC bus. The magnitude reference signal generator circuit may be operative to generate the magnitude reference signal responsive to a phase current of the AC bus and/or the DC voltage on the DC bus.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. It will be further understood that when transfer, communication, or other interaction is described as occurring "between" elements, such transfer, communication or other interaction may be bidirectional.

FIGS. 1-7 are schematic diagrams illustrating exemplary apparatus and methods according to various embodiments of the present invention. The items in these figures, and combinations thereof, may be implemented using one or more electronic circuits, for example, power electronics circuits, such as half-bridge circuits and drive circuits therefor controlled by a processor, such as a microprocessor or microcontroller, and/or by analog circuitry that provides substantially similar functionality. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations. Accordingly, the block diagrams support electronic circuits and other apparatus that perform the specified operations, and acts for performing the specified operations. It will be appreciated that the blocks may represent functional groupings of circuitry and that, even if separate functional blocks are illustrated, the same circuitry may be used in implementing the functions of the separate blocks.

Figure 1:
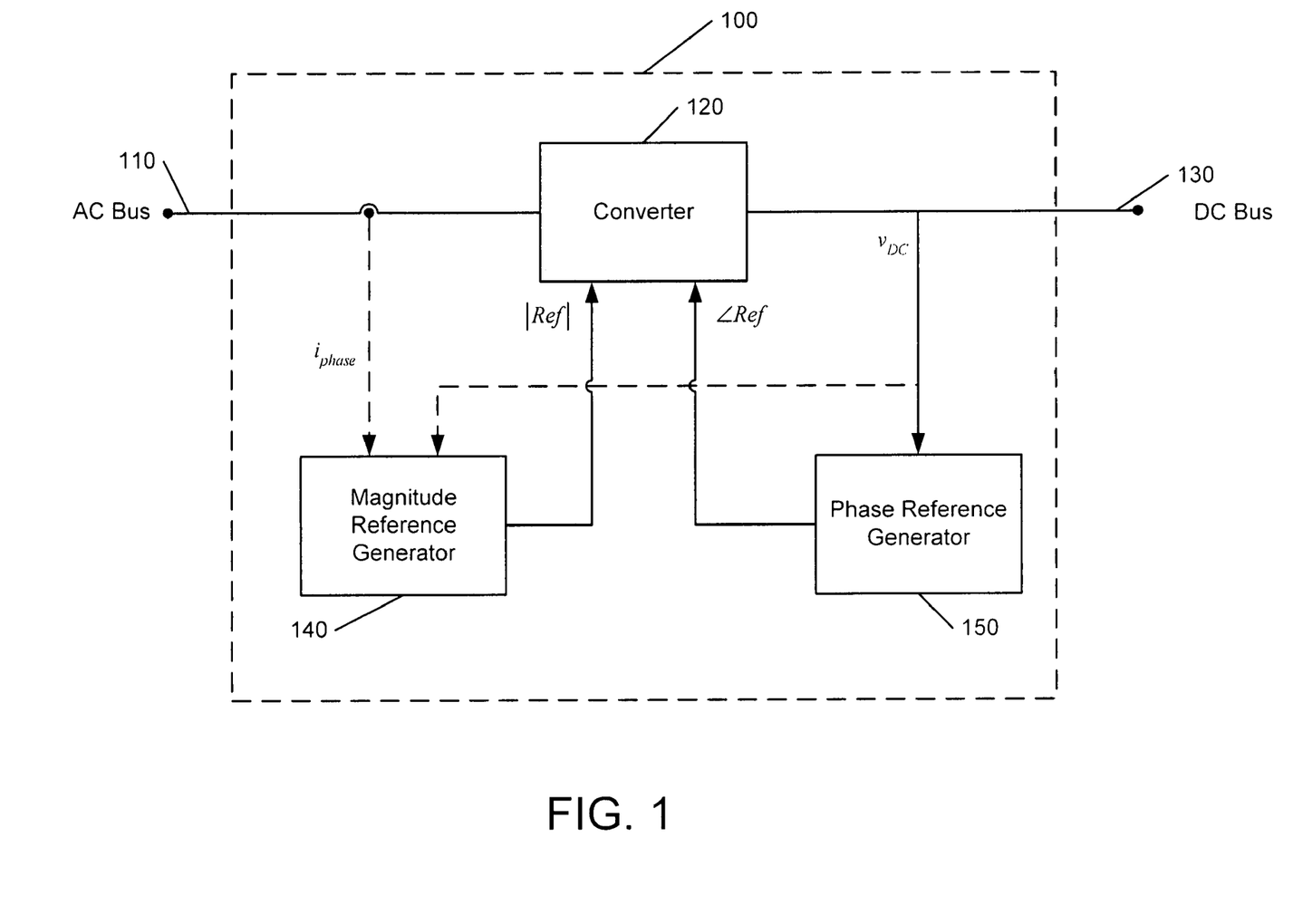
FIG. 1 is a schematic diagram illustrating a power converter apparatus according to some embodiments of the invention.

FIG. 1 illustrates a power converter apparatus 100 according to some embodiments of the invention. The apparatus 100 includes a power converter circuit 120, such as a pulse width modulated active bridge circuit, that transfers power between an AC bus 110 and a DC bus 130 responsive to a phase reference signal ∠Ref and a magnitude reference signal |Ref|. The apparatus 100 further includes a phase reference signal generator circuit 150 that generates the phase reference signal ∠Ref responsive to a DC voltage $v_{DC}$ on the DC bus 130. The apparatus 100 further includes a magnitude reference signal generator circuit 140 that generates the magnitude reference signal |Ref|. In some embodiments of the invention, the magnitude reference signal generator circuit 140 may generate the magnitude reference signal |Ref| responsive to a phase current $i_{phase}$ of the AC bus 110 and/or the DC voltage $v_{DC}$ on the DC bus 130. In further embodiments, the magnitude reference signal generator circuit 140 may generate the magnitude reference signal |Ref| in other ways. For example, the magnitude reference signal generator circuit 140 may supply the magnitude reference signal |Ref| as a fixed magnitude signal.

Figure 2:
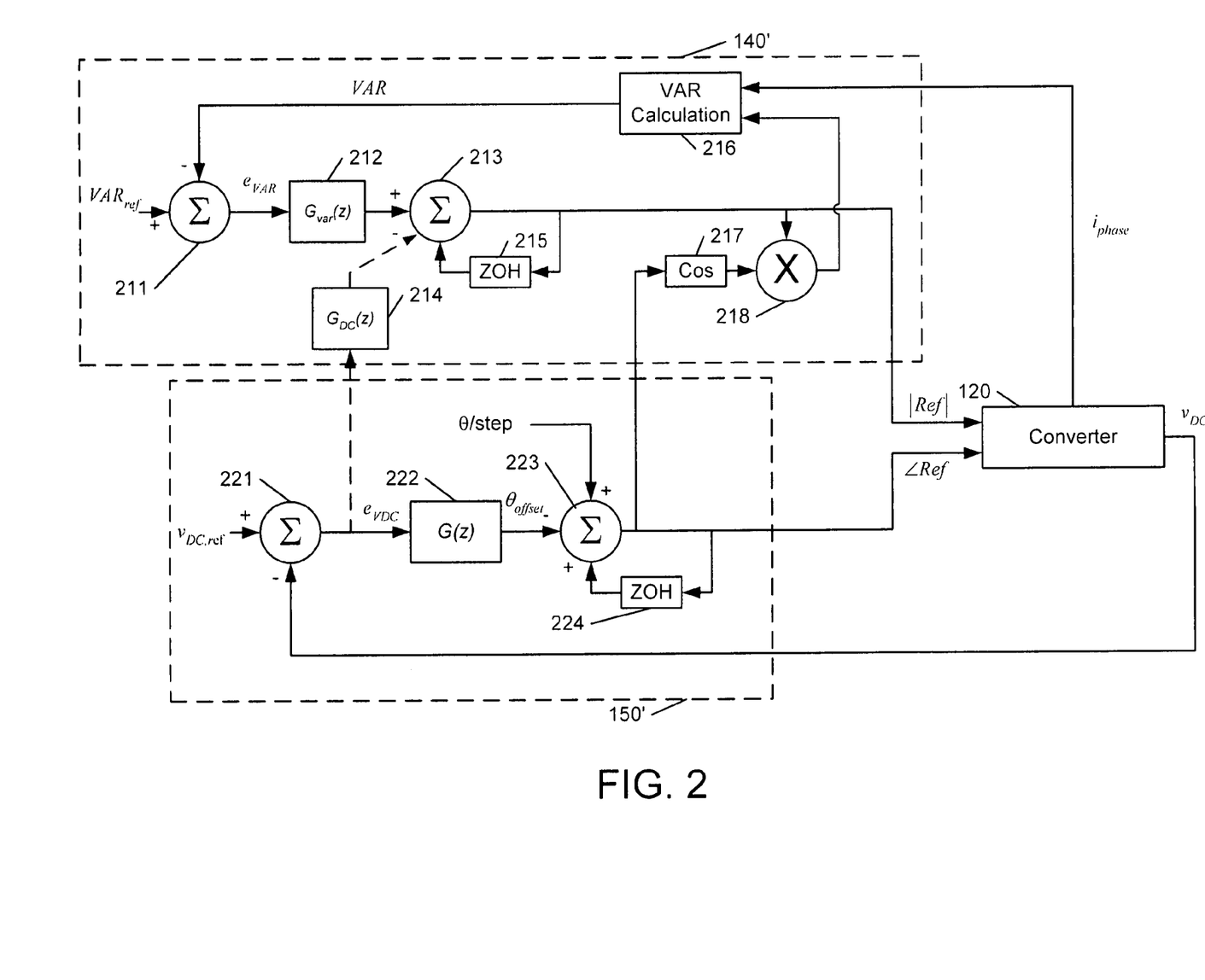
FIG. 2 is a schematic diagram illustrating a power converter control structure according to further embodiments of the invention.

FIG. 2 illustrates exemplary implementations of a phase reference signal generator circuit 150' and a magnitude reference signal generator circuit 140' for providing reference signals for a power converter circuit 120 according to some embodiments of the invention. In particular, FIG. 2 illustrates an exemplary control structure that may be implemented in a processor (not shown), such as a microcontroller or digital signal processor (DSP), configured to provide the illustrated functions of the phase reference signal generator circuit 150' and the magnitude reference signal generator circuit 140'. It will be appreciated that such a processor may also be used to perform some of the functions of the converter circuit 120. It will be understood that, although FIG. 2 illustrates a discrete (digital) control implementation, other embodiments of the invention may include analog control structures or a combination of analog and digital control structures.

Referring to FIG. 2, the phase reference signal generator circuit 150' includes a first summing junction 221 that generates a DC voltage error signal $e_{VDC}$ responsive to a comparison of the DC voltage (e.g., the voltage on the DC bus 130 of FIG. 1) to voltage reference signal $VDC_{ref}$. The error signal $e_{VDC}$ (i.e., a series of DC voltage error values) is provided to a compensation block 222 that produces a phase offset signal $\theta_{offset}$ according to a transfer function G(z) that includes differentiation of the error signal $e_{VDC\ in}$ the following form:

$$\theta_{offset} = \alpha(e_{VDC}(n) - \beta e_{VDC}(n-1), \tag{1}$$

where $e_{VDC}(n)$ and $e_{VDC}(n-1)$ are successively computed values of the DC voltage error generated from successive samples of the DC bus voltage, and where $\alpha$ and $\beta$ are constants that are generally dependent on the particular characteristics of the converter, e.g., circuit parameters (inductance, capacitance, etc.) of the converter.

The phase offset signal $\theta_{offset}$ (i.e., a series of digital values), is provided to second summing junction 223 that, in conjunction with a zero order hold (ZOH) block 224, generates phase reference signal ∠Ref values from previously generated values (stored by the ZOH block 224) according to an angle per step value θ/step, subject to offsets introduced by the phase offset signal values $\theta_{offset}$. The angle per step value θ/step represents a portion of the AC waveform period corresponding in time to a computational period of the loop (e.g., a 60 Hz AC waveform and a computation rate of 3125 Hz would yield a corresponding θ/step value of approximately 6.9°/step). The phase reference signal generator circuit 150', in conjunction with the converter circuit 120, may be viewed as a phase-lock loop that synchronizes the phase reference signal ∠Ref with the AC bus 110 by differentiating the DC bus voltage error, which contrasts with prior art techniques that generate phase/frequency reference signals from an AC input voltage. The angle per step value θ/step may be a fixed value based on an assumed (or measured) frequency of the AC voltage and/or may be adaptively varied responsive to the actual AC waveforms, e.g., by using zero crossing detection or a similar technique. The adaptive approach may be advantageous in environments or operational modes in which the AC input frequency varies significantly, e.g., when the AC input is coming from a backup generator or from a poorly controlled utility source. In some embodiments, it may be advantageous to provide a converter apparatus with both fixed and adaptive modes. For example, the angle per step value θ/step could be fixed when operating from a relatively well-controlled source, Such as a utility, and could be adaptively derived when operating from a less well-controlled AC source, such as a motor-generator set.

The magnitude reference signal generator circuit 140' includes a volt-amperes reactive (VAR) block 216 that generates a VAR signal VAR responsive to phase current $i_{phase}$ for the AC bus 110 and the phase reference signal ∠Ref. The VAR signal VAR is representative of an amount of VARs being transferred by the converter circuit 120. In particular, the phase reference signal ∠Ref is turned into a reference signal that is shifted 90° with respect to the angle represented by the phase reference signal ∠Ref by a cosine function block 217 and scaled according to a magnitude reference signal |Ref| by a multiplier 218. Exemplary techniques for VAR determination are shown, for example, in U.S. Pat. No. 6,549,440 to Tassitino, Jr. et al., the disclosure of which is hereby incorporated by reference in its entirety.

The VAR signal VAR is passed to a summing junction 211 that compares the VAR signal VAR to a VAR reference signal $VAR_{ref}$ and responsively generates a VAR error signal $e_{VAR}$. It will be appreciated that, in many cases, the VAR reference signal $VAR_{ref}$ will correspond to a VAR level substantially equal to zero. However, in some applications, such as applications in which a known amount of VAR-compensating capacitance is present at the AC bus 110, the VAR reference signal $VAR_{ref}$ may correspond to some non-zero VAR level.

The VAR error signal $e_{VAR}$ is compensated by a gain block 212 (which provides a gain $G_{var}(z)$), producing a signal that is provided to a summing junction 213 and associated ZOH block 215 that integrates (accumulates) the signal to generate the magnitude reference signal |Ref|. As shown in dashed line, the DC voltage error signal $e_{VDC}$ may be fed to the summing junction 213 via a gain block 214 (which provides a gain $G_{DC}(z)$).

Figure 3:
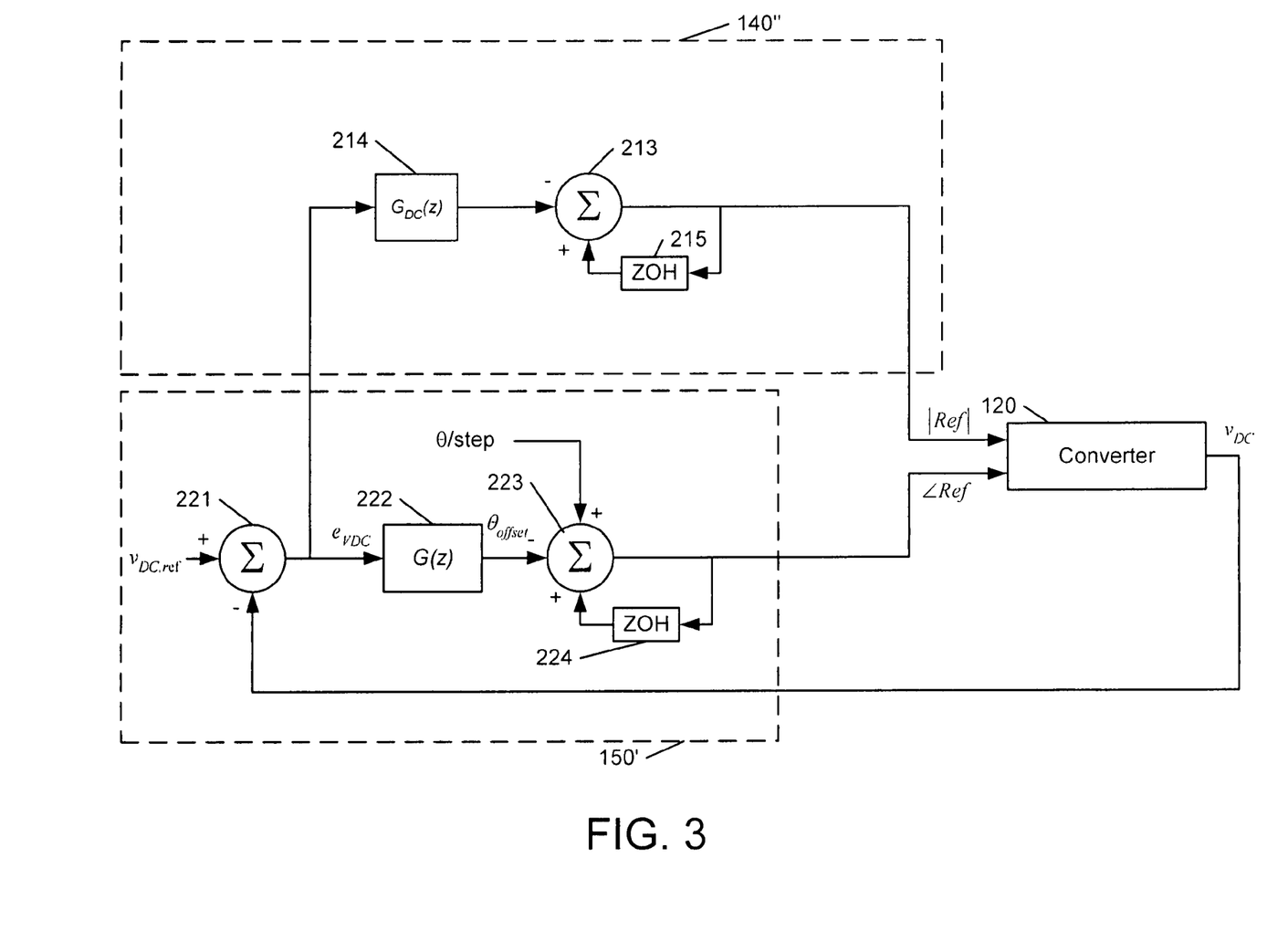
FIG. 3 is a schematic diagram illustrating a power converter control structure according to further embodiments of the invention.

FIG. 3 illustrates an alternative configuration of a magnitude reference signal generator circuit 140" according to further embodiments of the invention, in which a magnitude reference signal |Ref| is generated from the DC voltage error signal $e_{VDC}$ without a VAR control loop. Such a configuration may be useful, for instance, where VAR compensation is provided by circuitry other than the converter. Like items in FIGS. 2 and 3 are indicated by like reference numerals, and further discussion of these items will not be provided in light of the foregoing description of FIG. 2. As with the control structure shown in FIG. 2, FIG. 3 illustrates a control structure that may be implemented in a processor (not shown), such as a microcontroller or digital signal processor (DSP), configured to provide the illustrated functions of the phase reference signal generator circuit 150' and the magnitude reference signal generator circuit 140". It will be appreciated that such a processor may also be used to perform some of the functions of the converter circuit 120. It will be understood that, although FIG. 3 illustrates a discrete (digital) control implementation, other embodiments of the invention may include analog control structures or a combination of analog and digital control structures.

Figure 4:
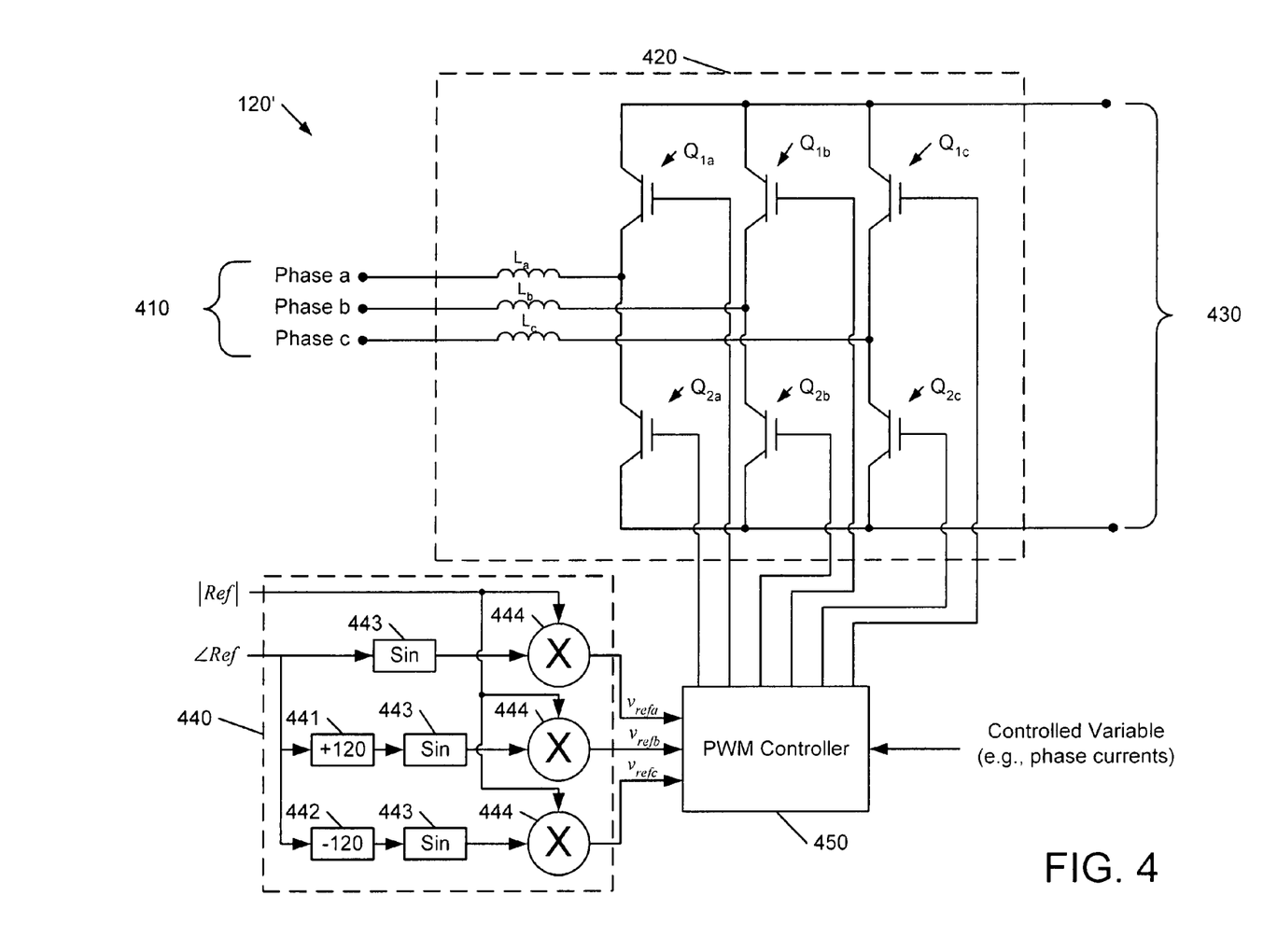
FIG. 4 is a schematic diagram illustrating an active bridge circuit with pulse-width modulation (PWM) control using phase and magnitude references according to further embodiments of the invention.

FIG. 4 shows a three-phase converter circuit 120' that may be controlled by phase and magnitude references signals, such as the phase and magnitude reference signals ∠Ref, |Ref| illustrated in FIGS. 2 and 3. The converter 120' include an active bridge circuit 420 that is coupled to an AC bus 410 and a DC bus 430 and controlled by a PWM controller circuit 450 responsive to the phase reference signal ∠Ref and the magnitude reference signal |Ref|. As shown, the rectifier circuit 420 includes three half-bridge circuits comprising complementary insulated gate bipolar transistor (IGBT) pairs $Q_{1a}/Q_{2a}$, $Q_{1b}/Q_{2b}$, $Q_{1c}/Q_{2c}$ and input inductors $L_a$, $L_b$, $L_c$.

The phase reference signal ∠Ref and the magnitude reference signal |Ref| are provided to a three-phase reference signal generator circuit 440 that creates three sinusoidal reference signals $v_{refa}$, $v_{refb}$, $v_{refc}$ that have a phasing (timing) controlled by the phase reference signal ∠Ref and that are scaled according to the magnitude reference signal |Ref|. In particular, the first reference signal $v_{refa}$ is generated by generating a sinusoidal signal corresponding to the phase reference signal ∠Ref in a sine function block 443, and scaling this signal by the magnitude reference signal |Ref|. The second reference signal $v_{refb}$ is generated by adding 120° to the phase reference signal ∠Ref in a phase shifting block 441, generating a sinusoidal signal from the resulting signal in a sine function block 443, and scaling this signal by the magnitude reference signal |Ref|. The third reference signal $v_{refc}$ is generated by subtracting 120° from the phase reference signal ∠Ref in a phase shifting block 442, generating a sinusoidal signal from the resulting signal in a sine function block 443, and scaling this signal by the magnitude reference signal |Ref|. The three reference signals $v_{refa}$, $v_{refb}$, $v_{refc}$ are provided to a PWM controller 450 that operates the transistors $Q_{1a}/Q_{2a}$, $Q_{1b}/Q_{2b}$, $Q_{1c}/Q_{2c}$ to control variables (e.g., phase currents and/or voltages) of the bridge circuit 420 responsive to the reference signals $v_{refa}$, $v_{refb}$, $v_{refc}$. Any of a variety of different control techniques may be used by the PWM controller 450, for example, the space vector domain control techniques described in U.S. Pat. No. 6,201,720 to Tracy et al. In further embodiments of the invention, rather than generating three phase reference signals $v_{refa}$, $v_{refb}$, $v_{refc}$ from a single pair of magnitude and phase reference signals ∠Ref, |Ref|, respective reference signals $v_{refa}$, $v_{refb}$, $v_{refc}$ may be generated from respective pairs of magnitude and phase reference signals, each of which is generated from respective different phase currents (or other phase variables). Such an approach may be useful in compensating for phase imbalances on the AC bus.

Referring to FIGS. 2, 3 and 4, and assuming that the converter 120 of FIGS. 2 and 3 take the form of the converter 120' shown in FIG. 4, the control structures in FIGS. 2 and 3 control the converter 120' (e.g., a pulse-width modulated bridge circuit, such as that shown in FIG. 4) by adjusting an AC magnitude reference signal |Ref| responsive to a VAR error and/or a DC voltage error, and by adjusting an AC phase reference signal ∠Ref using a phase locked loop (PLL) that derives phase information from the DC voltage error signal $e_{VDC}$, with the summing junction 223 and ZOH block 224 of FIG. 2 (or FIG. 3) and the sine wave generator circuitry 440 of FIG. 4 forming an error controlled oscillator that is controlled by the DC voltage error signal $e_{VDC}$. The bandwidth of such a PLL can generally be independent of the frequency of the AC bus, and such a PLL can stably operate at a relatively high computational rate (i.e., bandwidth) in comparison to some conventional phase/frequency control loops that attempt to determine the phase of an input AC waveform directly. Such conventional phase/frequency loops typically can generate a phase reference at a maximum rate of twice the number of phases of the AC bus times the fundamental frequency of the AC bus, e.g., for a three-phase detector at 60 Hz, around 360 Hz. In contrast to approaches that use such band limited detectors (e.g., zero crossing detectors), a PLL according to some embodiments of the invention illustrated in FIGS. 2, 3 and 4 may operate at a rate much higher than twice the number of phases of the AC bus times the fundamental AC frequency. For example, an exemplary synchronous rectifier controller of a 60 Hz AC input, three-phase UPS includes a PLL along the lines illustrated in FIGS. 2, 3 and 4 that produces a phase reference signal at rate of over 3 kHz.

Figure 5:
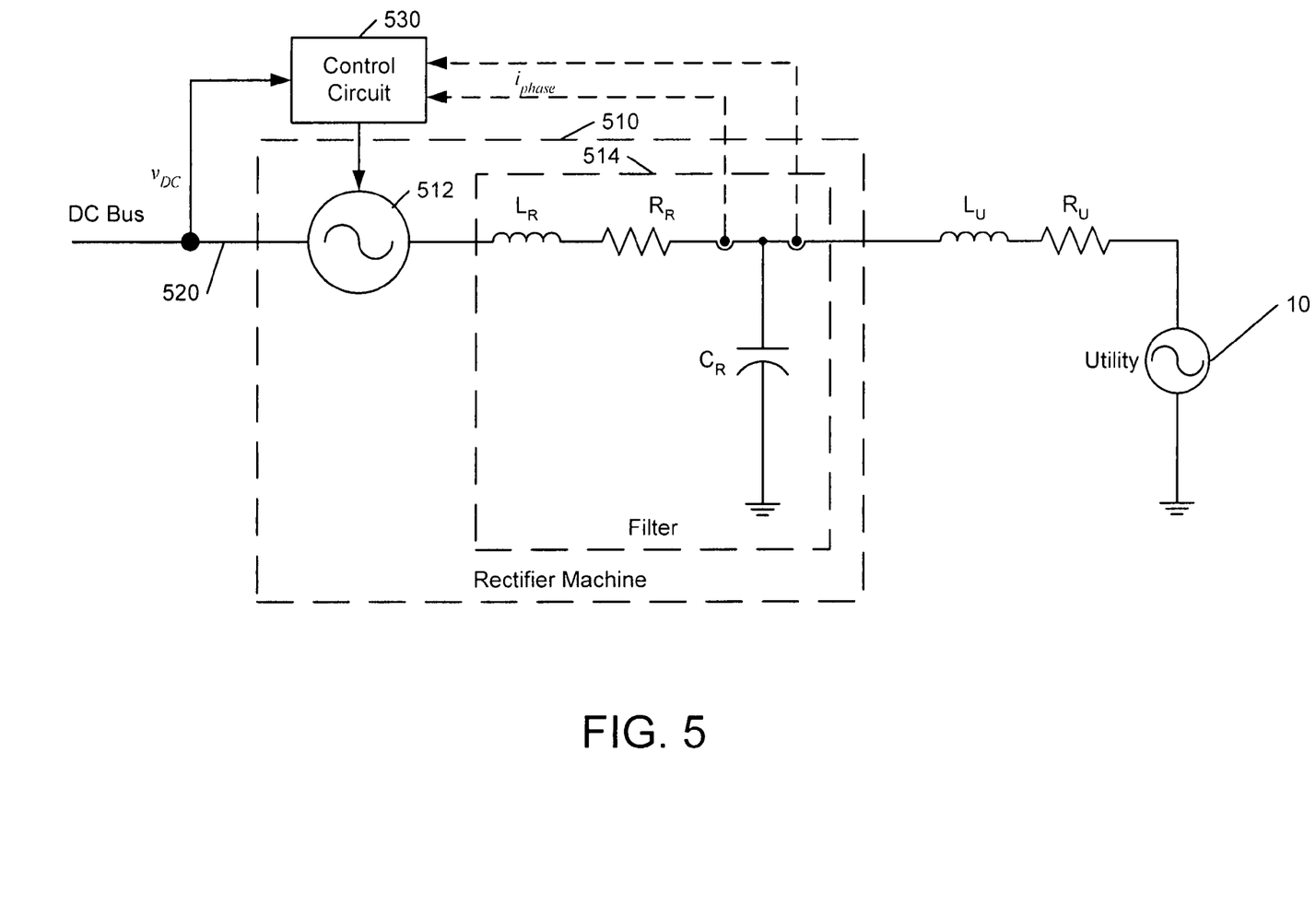
FIG. 5 is a schematic diagram illustrating control of a rectifier machine according to further embodiments of the invention.

Referring now to FIG. 5, in some embodiments of the invention, a control circuit 530 along the lines illustrated in FIGS. 2 and 4 (e.g., the active bridge shown in FIG. 4 and associated control structures in FIGS. 3 and 4) may be used to control an active bridge circuit 512 of a rectifier machine 510 that transfers power between a DC bus 520 and an AC source 10 via a rectifier filter 514 that includes an inductance $L_R$, a resistance $R_R$ and a capacitance $C_R$ (which may include, for example, VAR compensating capacitance) and that is coupled to the AC source 10 by an inductance $L_U$ and a resistance $R_U$ (e.g., resistance and inductance associated with the distribution network). The bridge circuit 512, controlled by the control circuit 530 responsive to a DC voltage on the DC bus 520 and, optionally, responsive to a phase current $i_{phase}$, may be viewed as an inverter that regulates an AC voltage v' at a "output" of the filter 514 to achieve a desired power transfer between the AC source 10 and the DC bus 520. Controlling the frequency (or phase angle, which is the integral of the frequency) and/or the magnitude of this voltage can control power flow between the DC bus 520 and the AC source 10. As shown, the phase current $i_{phase}$ may be measured at different points of the filter 514, and the point at which the phase current is sensed may affect the VAR reference that is used for the VAR loop implemented in the magnitude reference signal generator 140'. For example, if the filter capacitance $C_R$ substantially corresponds to VAR compensation capacitance connected to the utility, the current may be sampled at a point between the capacitance $C_R$ and the resistance and inductance $R_R$, $L_R$, and a non-zero VAR reference may be used.

Figure 6:
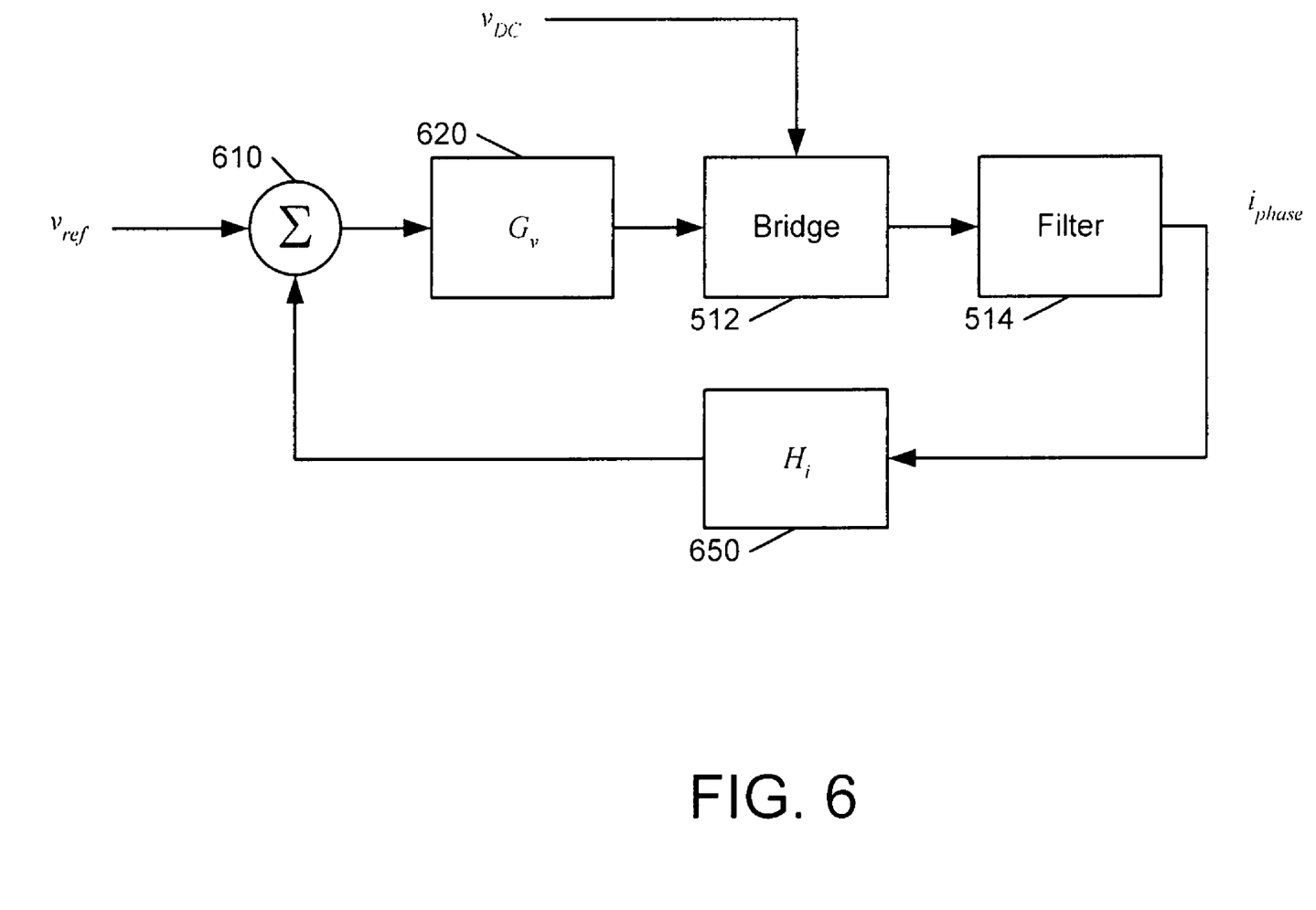
FIG. 6 is a schematic diagram illustrating an exemplary PWM control circuit configuration that may be used with some embodiments of the invention.

FIG. 6 illustrates an inner control loop architecture that may be used in the configuration illustrated in FIG. 5. A reference signal $v_{ref}$ (e.g., the reference signals $v_{refa}$, $v_{refb}$, $v_{refc}$ of FIG. 3) may be provided to a control loop that controls the bridge circuit 512 responsive to a phase current $i_{phase}$ of the rectifier filter 514. The control loop includes a forward compensation block 620, here shown as providing a low-pass transfer function $G_v$, a feedback gain block 650 with a transfer function $H_i$ and a summing junction 610. A transfer function $G_v(s)$ for use in an exemplary continuous domain controller is given by:

$$G_v(s) = gv1 \frac{s + gz1}{s + gp1}, \quad (2)$$

where gv1 is constant, gp1 represents a pole frequency and gz1 represents a zero frequency. A corresponding discrete (digital) domain transfer function is given by:

$$G_v(z) = gv2 \frac{x0 + x1 * z^{-1}}{1 + y1 * z^{-1}}, \quad (2)$$

where gv2 is a constant and x0, x1, and y1 are coefficients that provide equivalent poles and zeros. For a rectifier of a three-phase 20 kVa, 208V uninterruptible power supply (UPS) having input inductors with an inductance of 100 microhenrys and resistance of 13 milliohms, it has been found that the values of gv2=1, x0=0.332, x1=0, and y1=−0.668 provide advantageous performance using a controller with a rate of 12.5 kHz.

Figure 7:
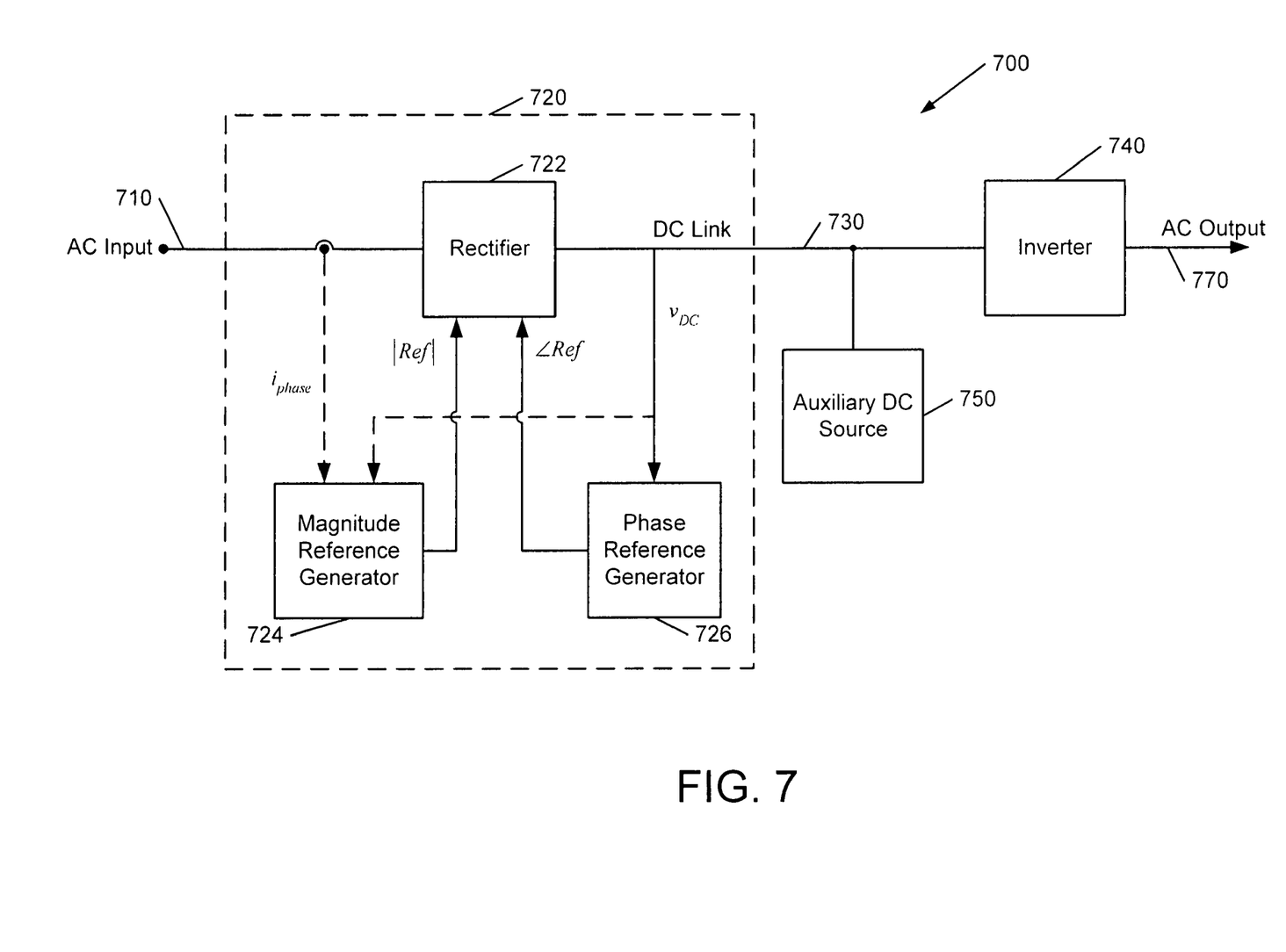
FIG. 7 is a schematic diagram illustrating an uninterruptible power supply (UPS) according to further embodiments of the invention.

FIG. 7 illustrates a UPS 700 according to further embodiments of the present invention. The UPS 700 includes a power converter circuit 720 that transfers power between an AC bus 710 and a DC bus 730, an inverter circuit 740 that produces an AC output 760 from a DC voltage on the DC bus 730, and an auxiliary DC source 750 that provides auxiliary power for the DC bus 730. The power converter circuit 720 includes a rectifier circuit 722 that is controlled by magnitude and phase reference signals |Ref|, ∠Ref generated by a magnitude reference signal generator circuit 724 and a phase reference signal generator circuit 726, respectively. As shown, the magnitude reference signal generator circuit 724 may generate the magnitude reference signal |Ref| responsive to a phase current $i_{phase}$ of the AC bus 710 and/or a DC voltage $v_{DC}$ on the DC bus 730. The phase reference signal generator circuit 726 generates the phase reference signal ∠Ref responsive to the DC voltage $v_{DC}$ on the DC bus 730. It will be appreciated that the converter 720 may operate along the lines discussed above with reference to FIGS. 1-6. It will be further appreciated that, although FIG. 7 illustrates an "on-line" UPS configuration, the invention is also applicable to UPSs that utilize other circuit configurations involving transfer of power between AC and DC busses, such as "line-interactive" UPSs.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of transferring power between a DC bus and an AC bus, the method comprising:
   generating a DC voltage error signal responsive to a DC voltage on the DC bus;
   differentiating the DC voltage error signal to generate a phase offset signal;
   generating a phase reference signal responsive to the phase offset signal;
   generating a magnitude reference signal; and
   transferring power between the AC and DC busses responsive to the phase offset signal and the magnitude reference signal.

2. A method according to claim 1:
   wherein generating a DC voltage error signal comprises:
      generating a series of samples of the DC voltage on the DC bus; and
      generating respective DC voltage error signal values for respective ones of the samples of the DC voltage;
   wherein differentiating the DC voltage error signal comprises determining weighted differences between successive ones of the DC voltage error signal values to generate a series of phase offset signal values; and wherein generating a phase reference signal responsive to the phase offset signal comprises generating a series of phase reference signal values from the series of phase offset signal values.

3. A method according to claim 2, wherein generating a series of phase reference signal values from the series of phase offset signal values comprises generating a phase reference signal value from a previously computed phase reference signal value, a phase offset signal value, and a phase angle-per-step value.

4. A method according to claim 3, further comprising generating the phase-angle-per step value responsive to an AC voltage on the AC bus.

5. A method according to claim 1, wherein generating a phase reference signal responsive to the phase offset signal comprises generating the phase reference signal responsive to the phase offset signal and a frequency of an AC voltage on the AC bus.

6. A method according to claim 1, wherein generating a phase reference signal comprises updating the phase reference signal at a rate that is independent of a frequency of an AC voltage on the AC bus.

7. A method according to claim 1, wherein generating a phase reference signal comprises updating the phase reference signal at a frequency greater than twice a number of phases of the AC bus times a fundamental frequency of an AC voltage on the AC bus.

8. A method according to claim 1, wherein transferring power between the AC and DC busses comprises operating a power converter responsive to the phase offset signal to provide power transfer between the AC and DC busses, and wherein the phase offset signal represents an amount of phase shift between an input of the power converter and an AC source driving the AC bus needed to maintain a desired voltage on the DC bus.

9. A method according to claim 1, wherein generating a magnitude reference signal comprises generating the magnitude reference signal responsive to a phase current of the AC bus and/or the DC voltage on the DC bus.

10. A method according to claim 9, wherein generating a magnitude reference signal comprises:

generating a volt-amperes reactive (VAR) error signal responsive to the phase current; and generating the magnitude reference signal responsive to the VAR error signal.

11. A method according to claim 10, wherein generating a VAR error signal comprises:

generating a VAR estimate signal responsive to the phase current, the magnitude reference signal and the phase reference signal; and generating the VAR error signal responsive to the VAR estimate signal and a VAR reference signal.

12. A method according to claim 9, wherein generating a magnitude reference signal comprises generating the magnitude reference signal responsive to the DC voltage error signal.

13. A method according to claim 1, wherein transferring power between the AC and DC busses responsive to the phase reference signal and the magnitude reference signal comprises:

generating a sinusoidal reference signal responsive to the phase reference signal;

scaling the sinusoidal reference signal according to the magnitude reference signal; and transferring power between the AC and DC busses responsive to the scaled sinusoidal reference signal.

14. A method according to claim 13:

wherein generating a sinusoidal reference signal comprises generating a plurality of sinusoidal reference signals responsive to the phase reference signal, the sinusoidal reference signals being phase offset from one another by predetermined phase angles corresponding to phase offsets among phases of the AC bus;

wherein scaling the sinusoidal reference signal comprise scaling each of the plurality of sinusoidal reference signals according to the magnitude reference signal; and wherein transferring power between the AC and DC busses responsive to the scaled sinusoidal reference signal comprises selectively coupling respective ones of the phases of the AC bus to the DC bus responsive to respective ones of the scaled sinusoidal reference signals.

15. An apparatus for transferring power between an AC bus and a DC bus, the apparatus comprising:

a power converter circuit operative to transfer power between the AC and DC busses responsive to a phase reference signal and a magnitude reference signal;

a phase reference signal generator circuit operative to generate the a DC voltage error signal responsive to the DC voltage on the DC bus, to differentiate the DC voltage error signal to generate a phase offset signal, and to generate the phase reference signal responsive to the phase offset signal; and a magnitude reference signal generator circuit operative to generate the magnitude reference signal.

16. An apparatus according to claim 5, wherein the phase reference signal generator circuit is operative to generate a series of samples of the DC voltage on the DC bus, to generate respective DC voltage error signal values for respective ones of the samples of the DC voltage, to determine weighted differences between successive ones of the DC voltage error signal values to generate a series of phase offset signal values and to generate a series of phase reference signal values from the series of phase offset signal values, and wherein the power converter circuit is operative to transfer power between the AC and DC busses responsive to the phase reference signal values.

17. An apparatus according to claim 16, wherein the phase reference signal generator circuit is operative to generate a phase reference signal value from a previously computed phase reference signal value, a phase offset signal value, and a phase angle-per-step value.

18. An apparatus according to claim 17, wherein the phase reference signal generator circuit is further operative to generate the phase-angle-per step value responsive to an AC voltage on the AC bus.

19. An apparatus according to claim 16, wherein the phase reference signal generator circuit is operative to generate the phase reference signal responsive to the phase offset signal and a frequency of an AC voltage on the AC bus.

20. An apparatus according to claim 15, wherein the magnitude reference signal generator circuit is operative to generate the magnitude reference signal responsive to a phase current of the AC bus and/or the DC voltage on the DC bus.

21. An apparatus according to claim 20, wherein the magnitude reference signal generator circuit is operative to generate a volt-amperes reactive (VAR) error signal responsive to the phase current and to generate the magnitude reference signal responsive to the VAR error signal.

22. An apparatus according to claim 21, wherein the magnitude reference signal generator circuit is operative to generate a VAR estimate signal responsive to the phase current, the magnitude reference signal and the phase reference signal and to generate the VAR error signal responsive to the VAR estimate signal and a VAR reference signal.

23. An apparatus according to claim 20, wherein the magnitude reference signal generator circuit is operative to generate the magnitude reference signal responsive to the DC voltage error signal.

24. An apparatus according to claim 15, wherein the power converter circuit comprises an active bridge circuit.

25. An apparatus according to claim 15, wherein the power converter circuit is operative to generate a sinusoidal reference signal responsive to the phase reference signal, to scale the sinusoidal reference signal according to the magnitude reference signal, and to transfer power between the AC and DC busses responsive to the scaled sinusoidal reference signal.

26. An uninterruptible power supply (UPS), comprising:
an AC bus;
a DC bus;
a power converter circuit operative to transfer power between the AC and DC busses responsive to a phase reference signal and a magnitude reference signal;
a phase reference signal generator circuit operative to generate a DC voltage error signal responsive to the DC voltage on the DC bus, to differentiate the DC voltage error signal to generate a phase offset signal, and to generate the phase reference signal responsive to the phase offset signal; and
a magnitude reference signal generator circuit operative to generate the magnitude reference signal.

27. A UPS according to claim 26, wherein the magnitude reference signal generator circuit is operative to generate the magnitude reference signal responsive to a phase current of the AC bus and/or the DC voltage on the DC bus.

28. A UPS according to claim 27, wherein the magnitude reference signal generator circuit is operative to generate a volt-amperes reactive (VAR) error signal responsive to the phase current and to generate the magnitude reference signal responsive to the VAR error signal.

29. A UPS according to claim 28, wherein the magnitude reference signal generator circuit is operative to generate a VAR estimate signal responsive to the phase current, the magnitude reference signal and the phase reference signal and to generate the VAR error signal responsive to the VAR estimate signal and a VAR reference signal.

30. A UPS according to claim 27, wherein the phase reference signal generator circuit is operative to generate a DC voltage error signal responsive to the DC voltage on the DC bus and to generate the phase reference signal responsive to the DC voltage error signal, and wherein the magnitude reference signal generator circuit is operative to generate the magnitude reference signal responsive to the VAR error signal and the DC voltage error signal.

31. A UPS according to claim 26, wherein the power converter circuit is operative to generate a sinusoidal reference signal responsive to the phase reference signal, to scale the sinusoidal reference signal according to the magnitude reference signal, and to transfer power between the AC and DC busses responsive to the scaled sinusoidal reference signal.

* * * * *

UNITED STATES PATENT AND TRADEMARK OFFICE
CERTIFICATE OF CORRECTION

PATENT NO. : 7,561,451 B2
APPLICATION NO. : 10/834696
DATED : July 14, 2009
INVENTOR(S) : Tracy et al.

It is certified that error appears in the above-identified patent and that said Letters Patent is hereby corrected as shown below:

Column 10, Claim 15, Line 24: Please correct "generate the a" to read -- generate a --

Signed and Sealed this

Twenty-fourth Day of November, 2009

David J. Kappos
*Director of the United States Patent and Trademark Office*